United States Patent [19]

Luebbert et al.

[11] 4,285,620

[45] Aug. 25, 1981

[54] SYMMETRICAL SPUR POINT DRILL

[75] Inventors: William K. Luebbert, Florissant; Thomas O. Blankenship, Marthasville; Lawrence F. Kuberski, St. Peters, all of Mo.

[73] Assignee: McDonnell Douglas Corporation, Long Beach, Calif.

[21] Appl. No.: 48,643

[22] Filed: Jun. 14, 1979

[51] Int. Cl.³ .............................................. B23B 51/04
[52] U.S. Cl. ................................... 408/212; 408/213; 408/211
[58] Field of Search ............... 408/211, 213, 204, 212, 408/207

[56] References Cited

U.S. PATENT DOCUMENTS

| | | | |
|---|---|---|---|
| 283,040 | 8/1883 | Swan | 408/213 |
| 796,321 | 8/1905 | Granberg | 408/211 |
| 1,966,176 | 7/1934 | Knapp | 408/213 |
| 2,114,668 | 4/1938 | Möler | 408/212 |
| 2,535,398 | 12/1950 | Economous | 408/211 |
| 2,556,745 | 6/1951 | Zimmerman | 408/213 X |
| 2,675,841 | 4/1954 | Einhiple | 408/212 |
| 2,792,862 | 5/1957 | Emmons | 408/204 X |
| 2,936,804 | 5/1960 | Kallid | 408/212 |
| 3,130,763 | 4/1964 | Schlosser et al. | 408/212 |
| 3,824,026 | 7/1974 | Gaskins | 408/213 X |

FOREIGN PATENT DOCUMENTS

| | | | |
|---|---|---|---|
| 1059378 | 6/1959 | Fed. Rep. of Germany | 408/211 |
| 499733 | 2/1920 | France | 408/204 |
| 293660 | 1/1971 | U.S.S.R. | 408/204 |

OTHER PUBLICATIONS

"Cutting Fabric, Prepreg & Composites of Kevar Aramid", Memo No. 348, Textile Fibers Dept., Du Pont Inc., 9-19-75.

Primary Examiner—William R. Briggs
Attorney, Agent, or Firm—John P. Scholl; George W. Finch; Donald L. Royer

[57] ABSTRACT

A drill for use on reinforced composite parts comprising a two fluted marginless drill body with four forward cutting edges, said edges first scribing a hole in the composite and then cutting the plug from the circumference of the hole inward to the axis of the hole.

10 Claims, 8 Drawing Figures

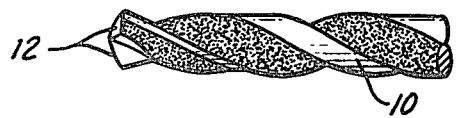
FIG—1 PRIOR ART
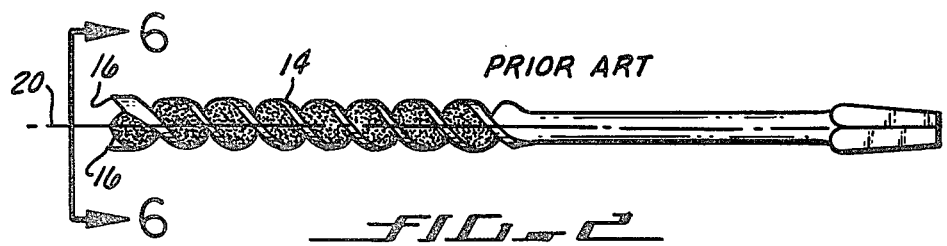
FIG—2 PRIOR ART
FIG—3 PRIOR ART
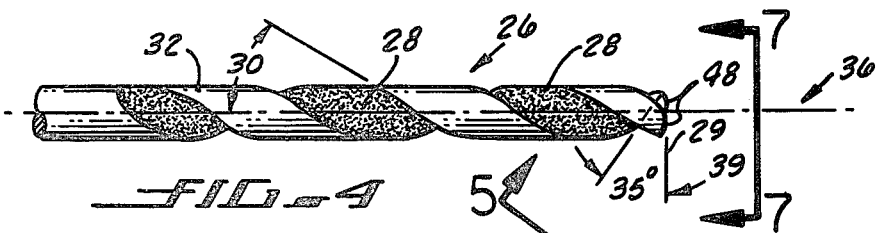
FIG—4
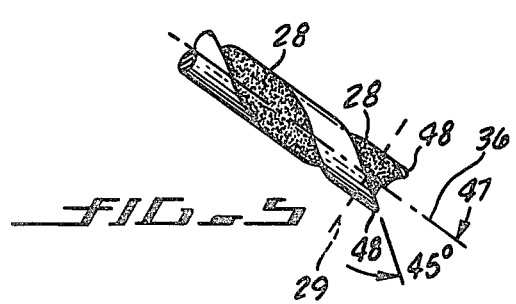
FIG—5

SYMMETRICAL SPUR POINT DRILL

BACKGROUND OF THE INVENTION

In the aerospace industry there is continual search for stronger and lighter weight materials for use in the manufacture of diverse products. For several years industry has used composite materials comprising epoxy reinforced with various types of fibers such as glass, nylon, Dacron, boron and graphite.

In 1972 DuPont introduced a new family of aromatic polyamide fibers under the name Kevlar. These fibers were assigned the generic name of "Aramid" by the F.D.A. The new Aramid are available in several different types. Kevlar 49, an extremely tough fiber has a high tensile strength of 430,000 p.s.i., approximately 20 times that of nylon and 10 times that of Dacron. The fiber elongation to break is quite low and the density, while slightly higher than nylon or Dacron, is 43% lower than glass. Kevlar 49 has a tensile strength approximately equal to steel at only one-fifth the weight. Weight savings of up to 30% have been realized for composites made with Kevlar 49 over composites reinforced with glass fibers. Considering all these beneficial properties, substantial new applications are possible for composite parts made of epoxy reinforced with Kevlar 49 fibers.

In order to use composite parts reinforced with Kevlar 49 fibers and make them into integral structures, holes must be drilled in the parts to receive screws, bolts and other fasteners. Due to the extreme toughness of the Kevlar 49 fibers, unusual problems are encountered in drilling the composite parts. Various types of drills have been tried on the Kevlar 49 fiber reinforced composites. While drills have been able to penetrate the composites, they have caused the composites to delaminate, and have not produced neat clean-cut holes.

Conventional drills having a center leading screw draw or pull the cutting edges of the drill into the composite part. This center leading screw bends and pushes the Kevlar fibers away from the drill point and interior cutting surfaces, preventing the fibers from being neatly sheared off. The resulting holes have fibers protruding from the sides and the composite part may be delaminated on the entrance or exit side of the part adjacent to the hole.

Some prior art drills have eliminated the center leading screw and rely upon sharp spur points on the edges of the drill to scribe a hole in the workpiece—see, for example, U.S. Pat. No. 283,040. In tests on Kelvar components the leading circumferential spurs on this drill scribed a hole and partially cut the reinforcing fibers, however, the drill has not produced satisfactory clean-cut holes because the interior cutting surfaces at the central portion of the drill cut from the inside of the hole adjacent the axis of the drill outward and tended to push the reinforcing Kevlar fibers away from the cutting surfaces near the axis of the drill producing a fuzzy and uneven hole with delamination of the part.

The toughness of the Kevlar 49 fibers requires that an inward shearing action take place when the drill penetrates the composite rather than an outward shearing action used on other materials. The fibers must be cut by first cutting the hole periphery and then the fibers must be sheared from the periphery of the hole inward toward the axis of the hole to remove the center plug.

SUMMARY OF THE INVENTION

The principal object of this invention is to provide a drill bit and system to make clean-cut holes in composite parts comprising epoxy reinforced with extremely tough fibers such as Kevlar 49 fibers. The inventive bit does not contain any central leading screw. The inventive drill comprises a cylindrical marginless drill body having two flutes symmetrical about the axis of the drill. The flutes define symmetrical lands. Four faces are located on the lands on the forward end of the drill. The four faces are divided into two sets of faces symmetrical about the axis of the drill. Each face defining a forward or cutting edge and a trailing edge relieved from said forward edge. The inventive bit has two symmetrical outer cutting spurs or tips that scribe a hole in the composite part. The symmetrical inner cutting surfaces cut from the periphery of the scribed hole toward the center or axial line of the bit. The inventive bit can be run, for example, at 2000 r.p.m. and a feed rate of one-half inch per minute. The bit is forced into the composite by pressure on the drill.

The inventive drill may be used with sacrificial backup spacers of aluminum, masonite or other smooth rigid material to allow the drill to shear smoothly the Kevlar composite as it exits the material and thereby enhance cutting of the Kevlar fibers and prevent delamination of the part. A drilling block may be used to guide the drill during the start of the hole in the composite part.

BRIEF DESCRIPTION OF THE DRAWINGS

FIG. 1 is a side elevation view of the forward end of a prior art twist drill with a protruding center cutting surfaces;

FIG. 2 is a side elevation view of a prior art twist drill with opposed peripheral cutting edges and without center leading screw;

FIG. 3 is a side elevation view of a prior art spade drill with an asymmetrical cutting surface;

FIG. 4 is a side elevation view of the inventive twist drill showing the interior cutting edge in phantom line on the forward end of the drill;

FIG. 5 is an auxiliary view of the inventive drill taken along the line 5—5 of FIG. 4 to show outside cutting surface in its true relationship;

DESCRIPTION OF THE PREFERRED EMBODIMENT

In FIG. 1 a prior art type twist drill 10 with protruding forward cutting edges 12 is depicted. When this drill was used to cut holes in a composite part reinforced with Kevlar 49 fibers, incomplete cutting of the reinforcing fibers occurred, together with delamination of the workpiece. The protruding cutting surfaces 12 of the drill pushed the reinforcing fibers away from the side cutting surfaces rather than shearing them off. The hole resulting from the use of the drill was fuzzy with broken fibers and the entrance and exit portions of the part adjacent the hole were delaminated.

Figure 6:
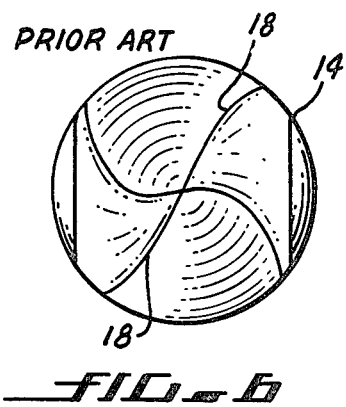
FIG. 6 is an end view of the cutting surfaces of the prior art drill of FIG. 2 along the line 6—6.

FIG. 2 and FIG. 6 depict a prior art twist drill or auger 14 of U.S. Pat. No. 283,040. According to the patent this drill 14 has no center lead screw but a protruding center point that tends to pull the drill into the workpiece. The drill has forward symmetrical cutting spurs 16. These spurs 16 are the first part of the drill to contact the workpiece and they scribe a hole in the workpiece. Following the initial scribing of the material, the inside cutting edges 18 (FIG. 6) attack the material in the center of the hole and push that material away from the center or axis of the hole outward toward the periphery of the hole. Although this bit 14 had no center lead screw, according to the text of the Patent, the inner cutting surfaces on the front of the bit protrude forward and draw the bit into the workpiece. From the end view of FIG. 6, it can be seen that the inside forward cutting edges cut the material from the inside of the hole outward to the periphery of the hole. Due to configuration of the inner cutting surfaces and the manner of cutting that takes place in the center of the hole, the tough Kevlar 49 fibers in the epoxy composite tend to be pushed outwardly from the center of the hole creating a hole with severely frayed fibers around the periphery as opposed to hole wherein the fibers have been sheared off cleanly.

FIG. 3 depicts a spade type drill 22 with an asymmetrical cutting edge 24. This drill was recommended by the DuPont Company, the originator of the Kevlar Aramid product as a drill to cut holes in composite reinforced with Kevlar 49 fibers. A test of this drill on Kevlar/Epoxy composites produced holes in the workpiece which had some frayed edges and which were subject to delamination.

Figure 7:
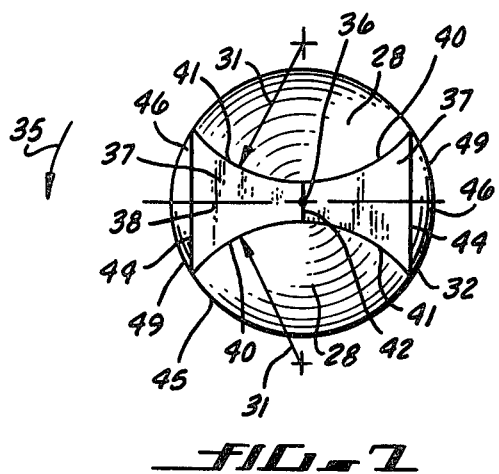
FIG. 7 is an end view of the cutting surfaces of the inventive drill of FIG. 3 along the line 7—7.

The inventive drill or bit 26 as shown in FIGS. 4, 5 and 7 is a marginless twist drill having two symmetrical helical flutes 28 disposed at a helix angle 30 in the range of 23 to 29 degrees. The cross section of said flutes, taken in the plane 29 perpendicular to the axis of the drill body as shown in FIG. 7, are in the shape of semicircles with a flute radius 31 cut from the circumference of the drill body 32.

While a twist drill with helical flutes has been shown as the preferred embodiment, it has been found that a cylindrical marginless drill having straight flutes of similar cross section has produced acceptable holes in the Kelvar composites.

In FIG. 7, the drill 26 rotates counterclockwise in the direction of arrow 35. Four surfaces are located on the cutting end of the inventive drill. These surfaces are divided into two sets of surfaces symmetrically located about the axis 36 of the drill 26.

A first or inside set of symmetrical surfaces 37 pass through the major diameter 38 of the drill 26 and are disposed at an angle 39 (FIG. 4) of approximately 35° to a plane 29 perpendicular to the axis 36 of the drill. These inside surfaces 37 may vary plus or minus five degrees from the 35° of angle 39. Each surface has a leading or cutting edge 40 and a trailing edge 41 which is relieved from the cutting edge 40 and front end of the drill 26. The leading edge 40 is the edge that first contacts the scribed core or plug in the workpiece in a drilling operation and is the front edge as the drill twists into the workpiece. The inside set of symmetrical planes 37 meet along the minor diameter 42 of the drill 26. The inside surfaces 37 define the cutting edges 40 and the trailing edges 41. The inside surfaces extend from the minor diameter 42 of the drill to a line 44 drawn between the points where the flute radiuses 31 meet the periphery 45 of the drill 26.

The second set of surfaces 46 begin along the lines 44 and extend radially to the circumference 45 of the drill 26.

These second or outside surfaces 46 are orientated at an angle 47 of 45° to the axis 36 of the drill 26 measured at the major diameter 38. Angle 47 may vary plus or minus 5°. These second surfaces 46 form two cutting spurs 48, the cutting edges 49 of which lie along the periphery 45 of the drill. These cutting edges 49 are the first part of the drill 26 to contact the workpiece and they scribe a circle in the workpiece.

Figure 8:
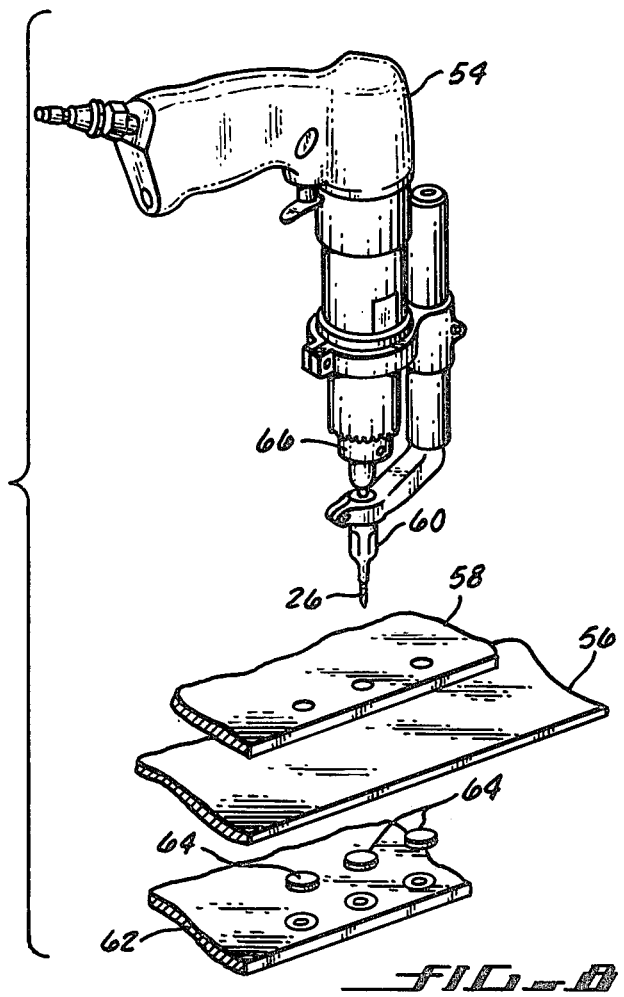
FIG. 8 is a oblique view of pneumatic type drill motor, with drill guide bushing and drilling block to locate holes in the workpiece and backup block with sacrificial spacers to enhance cutting of the Kevlar fibers in the composite and prevent delamination on exit side of the part.

In FIG. 8 the inventive drill 26 is shown with attachments to obtain the best hole in Kevlar 49 composites. The inventive drill 26 is mounted in a pneumatic powered hand drill 54. The drill 26 is positioned on the workpiece 56 by a drill block 58 which is clamped to the entrance side of the workpiece. A drill guide bushing 60 in conjunction with the drill block 58 centers the drill on the Kevlar composite workpiece 56. To prevent delamination at the exit side of the workpiece a backup block 62 is clamped against the workpiece 56. This block 62 may be provided with sacrificial spacers 64 made of aluminum, masonite or other suitable material.

In operation, the inventive drill 26 is placed in the chuck 66 of the pneumatic hand drill 54. The inventive drill 26 passes through a drill guide bushing 60. The Kevlar composite workpiece 56 is clamped between a drill block 58 and a backup block 62. The drill guide bushing 60 in conjunction with drill block 58 centers the inventive drill or bit 26 on the workpiece 56. The cutting edges 49 of the symmetrical spurs 48 contact the workpiece 56 and scribe a circle with a diameter equal to the major diameter 38 of the drill 26. Thereafter the cutting edges 40 of the inside surfaces 37 contact the interior plug and cut away the plug or core of the hole from periphery or outside of the circle toward the center of axis of the hole. When the drill 26 has penetrated the workpiece 56 it enters a sacrificial spacer 64 located in the backup block 62. This backup block 62, together with the sacrificial spacer 64, assists in the prevention of workpiece 56 from delamination. When the drilling of holes in the workpiece 56 has been completed, the drill block 58 and the backup block 62 are unclamped from the workpiece 56 and removed. The sacrificial spacers may then be replaced in the backup block 62.

While certain exemplary embodiments of this invention have been described above and shown in the accompanying drawings, it is to be understood that such embodiments are merely illustrative of, and not restrictive on, the broad invention and that we do not desire to be limited in our invention to the specific constructions or arrangements shown and described, since various other obvious modifications may occur to persons having ordinary skill in the art.

What is claimed is:
1. A drill having a forward cutting end, comprising:
 a cylindrical marginless drill body having two flutes symmetrical about the axis of the drill body which define two symmetrical lands, the cross section of said flutes, taken in the plane perpendicular to the axis of the drill body, are in the shape of semicircles cut from the periphery of the drill body;
 four surfaces on the forward end of said drill body, said surfaces divided into two sets of surfaces symmetrical about the axis of the drill body, each said surface having a forward or cutting edge and a trailing edge which is relieved from said cutting edge, the first or inside two symmetrical surfaces adjacent the axis of the drill body comprising planes passing through the major diameter of the drill and disposed within the range of 30 to 40 degrees to the plane perpendicular to the axis of the drill body, said surfaces meeting at the minor diameter of the drill and extending from the axis of the drill body radially to the line between the points where the flute radiuses meet the periphery of the drill, and the second two symmetrical faces comprising planes passing through said line between the points where the flute radiuses meet the periphery of the drill and disposed within the range of 40 to 50 degrees to the axis of the drill measured along the major diameter of the drill said first and second sets of planes intersecting along said line between the points where the flute radiuses meet the periphery of the drill, said second planes extending from said line radially to the periphery of the drill, said second faces defining two symmetrical spurs which contact the workpiece first in a drilling operation.

2. The drill of claim 1 wherein the two flutes are helical about the drill body and form a twist drill.

3. The drill of claim 2 wherein the angle of the flute helix is approximately 30 degrees to the axis of the drill.

4. The drill of claim 3 wherein the first two symmetrical faces are disposed at 35 degrees to the plane perpendicular to axis of the drill.

5. The drill of claim 4 wherein the second two symmetrical faces are disposed at 45 degrees to the axis of the drill.

6. A drill having a forward end to engage a workpiece comprising:
  a drill body having two symmetrical accurate flutes cut from said body thereby defining two symmetrical lands having major and minor diameters;
  two symmetrical inside frontal surfaces passing thru the major diameter of said lands, said surfaces intersecting at the axis of the drill body along the minor diameter or said lands, said inside surfaces inclined at a first angle to a plane perpendicular to the axis of the drill, said inside surfaces forming two symmetrical arcuate cutting edges extending from the circumference of the drill to the minor axis of the land;
  two symmetrical outside frontal surfaces intersecting said two inside frontal surfaces along lines drawn from the intersection of the arcuate flutes and the circumference of the drill, said surfaces forwardly inclined toward the circumference of the drill at a second angle to a plane passing thru said intersection points and the axis of the drill, said outside surfaces defining arcuate cutting edges along the circumference of the drill, said arcuate cutting surfaces are the first portion of the forward end of the drill to engage and scribe a hole in the workpiece.

7. The drill of claim 6 wherein said inside surfaces are inclined at a first angle between 30 to 40 degrees.

8. The drill of claim 7 wherein said outside surfaces are inclining at a second angle of between 40 to 50 degrees.

9. The drill of claim 8 wherein the flutes are helical and inclined at an angle of 23 to 29 degrees.

10. The drill of claim 9 wherein said first angle is 35 degrees and second angle is 45 degrees.

* * * * *